United States Patent [19]

Lemonnier

[11] Patent Number: 4,792,454
[45] Date of Patent: Dec. 20, 1988

[54] CONTAINER FOR FERMENTATION
[75] Inventor: Jean Lemonnier, Le Vesinet, France
[73] Assignee: Millipore Corporation, Bedford, Mass.
[21] Appl. No.: 99,644
[22] Filed: Sep. 23, 1987

Related U.S. Application Data

[63] Continuation of Ser. No. 888,537, Jul. 21, 1986, abandoned.

[30] Foreign Application Priority Data

Jul. 22, 1985 [FR] France ............................... 85 11183

[51] Int. Cl.⁴ ............................................... C12G 1/06
[52] U.S. Cl. ....................................... 426/8; 99/323.2; 426/112; 426/124; 426/422; 426/477
[58] Field of Search ..................... 99/323.1, 323, 276, 99/277, 277.1, 277.2, 278, 323.2; 426/8, 112, 124, 422; 261/DIG. 7

[56] References Cited

U.S. PATENT DOCUMENTS

| | | | |
|---|---|---|---|
| 2,114,009 | 4/1938 | Ramsay | 99/277.1 |
| 2,203,229 | 6/1940 | Nilsson | 99/277.1 |
| 3,492,671 | 1/1970 | Houey | 99/323.2 |
| 3,657,994 | 4/1972 | Post | 99/323 |
| 4,009,285 | 2/1977 | Spooner | 426/8 |
| 4,173,656 | 11/1979 | Duggins | 426/124 |
| 4,466,342 | 8/1984 | Basile | 261/DIG. 7 |

FOREIGN PATENT DOCUMENTS

| | | |
|---|---|---|
| 0133346 | 2/1985 | European Pat. Off. . |
| 776875 | 11/1934 | France ............. 99/323.1 |
| 2432045 | 7/1978 | France . |

Primary Examiner—Robert W. Jenkins
Attorney, Agent, or Firm—Andrew T. Karnakis

[57] ABSTRACT

A device particularly suitable for refermentation of sugared wine in a bottle according to the champagne method consists of a cartridge comprising a tubular body formed with grooves and perforations which provide fluid communication between the exterior of the cartridge and its inner bore. In one embodiment a portion of the perforations are covered by a hydrophilic membrane filter and another portion by a hydrophobic membrane filter, both of which are sealingly welded or glued to the exterior of the body. In a preferred embodiment, one of the ends of the tube is open and sealingly covered by the hydrophobic membrane filter while the hydrophilic membrane filter covers the perforations. The cartridge can be filled with yeasts and inserted into the bottle neck to allow fermentation to occur without the need for manipulation and disgorgement of congealed wine through the bottle neck.

12 Claims, 8 Drawing Sheets

CONTAINER FOR FERMENTATION

This is a continuation of application Ser. No. 888,537 filed on July 21, 1986 now abandoned.

FIELD OF THE INVENTION

This invention relates generally to a device adapted for use in the preparation of sparkling wine and in particular champagne by a second fermentation or refermentation, in the bottle, of a non-foamy wine. More specifically, this invention relates to a module incorporating membrane filters especially designed for carrying out this fermentation process.

BACKGROUND OF THE INVENTION

The so called "champagne method" for producing sparkling wine consists of adding to normal, unfoamy wine, which has undergone a first alcoholic fermentation, a decanting liquor containing sugar and fermentation yeast which causes transformation of the sugar into carbonic gas ($CO_2$). Bottling may be effected either before or after the addition of the decanting liquor and yeast. Bottles are thereafter sealed by means of a hollow plastic plug inserted into the bottle neck and crimped on by means of a metallic cap.

The bottles are stored generally horizontally on "slats" for a long period ranging from several weeks to several months in cellars where the temperature is maintained constant generally between 12° and 18° C. This allows fermentation to develop with corresponding pressurizing or bubble production (i.e., foaming up) in the bottles.

During this long fermentation period each bottle must be shaken individually at repeated intervals to prevent fermentation deposits from adhering to the bottle walls. At the end of this period the bottles are stored on their head, i.e., the bottle neck is inclined downwardly to facilitate decantation of yeasts and to allow deposition of fermentation dregs within the hollow plastic plug in the bottle neck.

When fermentation is completed, the bottles are transported vertically with their necks down to a brine bath refrigerated and maintained at about −10° C. The bottles are dipped into the icy bath to form by congealation a wine block of ice containing residues of the fermentation yeasts.

The bottles are submitted thereafter to a disgorging operation which consists of turning the necks of the congealed bottles up to a vertical position and then removing the caps thereby causing, due to the effect of higher pressure built up from gas formation within the bottle, ejection of the plastic cap together with with the attached ice block which contains the fermentation sediments. The level in the bottles is then restored by adding a dispatch liquor, and the bottle is sealed by a permanent plug which generally is a conventional cork oak plug.

The traditional champagne method which has just been described requires a large number of people particularly during fermentation for shaking the bottles, as this is often done manually. This method also involves a large ground surface for storage of the bottles and, due to the long storage times involved, this storage area becomes "tied up" sometimes up to a full year. Moreover, this method includes a step of congealing the bottle neck which is indispensable for elimination of yeasts.

Attempts have been made to try to remedy such disadvantages. For example, many devices have been devised to provide mechanical shaking of the bottles while disposed on movable pallets which permit the bottles to take any possible inclination from the horizontal position to the vertical position. These devices include means to rotate the bottles in all directions and under different inclinations. However, even if these devices can reduce the costs of labor, they require nevertheless significant investments which up to now have limited their commercial use.

Recently it has also been proposed to add yeasts into the bottles in the form of small balls of polymeric material, such as alginates, with yeast encapsulated therein. This process, however, has only been developed insignificantly until now because it involves a number of inconveniences. First an external material (i.e., the polymeric material) is added to the wine upon fermentation. Furthermore this process presents technical problems which have not yet been entirely solved. For example, poor retainment of yeasts in the balls enables a portion thereof to escape and precipitate in the wine thereby producing sediment. Finally, this process does not eliminate the need for the congealation and disgorging steps with the resultant loss of wine contained in the disgorged ice block.

SUMMARY OF THE INVENTION

The object of this invention is to provide a device and a process for overcoming the above described disadvantages and limitations of the prior art.

The device according to one embodiment of the invention consists of a tubular cartridge characterized in that it comprises a perforated tubular body and two filtering membranes, a portion of the perforations of the cartridge body are covered by a hydrophilic membrane filter and another portion by a hydrophobic membrane filter. Each of these membranes are preferably fixed to the outside of the cartridge body primarily by welding or gluing.

The inner bore of the cartridge can be filled with yeasts to cause fermentation of sugar with the resultant escape of carbonic ($CO_2$) gas and is sealed closed before being introduced into the bottles containing sugar-admixed wine for its refermentation according to the champagne method.

The process according to the invention consists of using such a cartridge as described above containing yeasts to cause refermentation of the sugared wine in bottles.

The hydrophilic membrane filter permits the sugared wine to penetrate and contact yeasts disposed within the tubular cartridge while retaining the yeasts within the cartridge. The hydrophobic membrane permits the carbonic gas formed during the fermentation reaction of sugar and yeast within the cartridge to be discharged outwardly from the cartridge and into the wine. This double fluid circulation, i.e., liquids to the inside of the cartridge and gases to the outside, which is required to ensure proper fermentation reaction processing, is obtained according to this invention because of the presence of the two membrane filters one being hydrophilic and the other hydrophobic.

In view of this invention it is no longer necessary to perform mechanical or manual shaking of bottles during the fermentation period since there is no risk of adherence of yeasts to the inner walls of the bottles as the yeasts remain entrapped within the cartridge.

Also, it is no longer necessary to freeze the bottle neck to form an ice block containing residues of fermentation yeasts since the tubular cartridge which contains all the yeasts can be recovered after fermentation upon opening the bottles. This can be done by taking the cap off and removing the cartridge either manually or mechanically if the cartridge is provided with means for grasping it. Even better, the cartridge may be discharged due to the effect of higher pressure within the bottle if the cartridge is provided with a cylindrical end piece which doubly serves as a sealing plug in the bottle neck and a cover to provide fluid tight sealing of the cartridge itself.

It should also be noted that no foreign matter is introduced into the sugared wine to be fermented, rather only a sealed tubular cartridge formed of biologically inert materials. Since according to the invention the sugared wine is brought into contact with the yeasts within the sealed cartridge to produce the second fermentation and resultant discharge of carbonic gas, the yeasts are not introduced directly into the sugared wine as is the case with the prior known processes.

DESCRIPTION OF THE DRAWINGS

This invention and its other aspects and advantages will now be described with reference to the attached drawings in which the membranes have been supposed to be transparent in order to expose the underlying structure of the various embodiments and in which.

DESCRIPTION OF THE INVENTION

A cartridge for fermentation as represented both in the embodiment of FIGS. 1 to 4 and 9 and that of FIGS. 5 to 8 is identified by the reference numeral 10. This cartridge comprises a perforated tubular body 11 of a generally cylindrical shape, said perforations being in fluid communication with the inner bore of the body. The lower end 12 of the body is closed and the upper open end comprises a cylindrical end piece 13 of a diameter larger than that of the tubular body 11.

The tubular body 11 of the cartridge 10 includes a series of outer grooves 14 having perforations 15 formed therein. The grooves act as drainage grooves and as shown in FIGS. 1 to 8 are of a circular shape having the same centerline as the tubular body. The grooves are delimited by circular edge portions 17 and cover more than three quarters of the circumference of a cross section of the body 11 as shown more particularly by FIGS. 3 and 7. The grooves 14 terminate at a rectilinear ungrooved portion 16 of the outer surface of the body 11 which is aligned according to a generatrix of the tubular body (see FIGS. 1, 3, 5 and 7).

Within each of the grooves 14 at least two perforations 15 are formed, each of a substantially rectangular shape, which provide fluid communication between the outer surface of the body 11 and its inner bore. The grooves are aligned respectively according to a direction parallel to the centerline of the body 11 and are disposed on both ends of a diametral plane thereof and preferably at a right angle with respect to the ungrooved portion 16 (see FIGS. 3 and 7).

In the embodiment shown in FIGS. 1 to 4 the entire height of the outer cylindrical surface of the tubular body 11 is grooved except for those portions adjacent to the lower end 12 and upper end 13. On the other hand, in the embodiment shown in FIGS. 5 to 8 (see particularly FIG. 5) the outer surface of the body 11 presents two distinct grooved zones 18 and 19 separated by an intermediate ungrooved zone 20 whose function will be explained below. The grooved zones 18 and 19 are of different height, the zone adjacent the upper end being longer than that adjacent the lower end (see FIGS. 5 and 6).

In both embodiments thus far described the grooved and perforated areas of the tubular body 11 are totally covered by two membrane filters, one membrane 21 being hydrophilic and the other membrane 22 being hydrophobic. For the embodiment of FIGS. 1 to 4, both membrane filters 21 and 22 can be prepared from two separate strips, each composed of the particular membrane and welded together in the longitudinal direction according to an intermediary weld as shown at 23 in FIG. 4. In this manner a composite strip of two membranes of indeterminate length but whose width corresponds to the total height of the outer grooved surface and of the ungrooved portions of the tubular body 11 can be formed. It should be noted that this composite strip can consist of a larger or smaller proportion of either one of both types of membranes and accordingly the location of the weld 23 will vary correspondingly.

The composite strip with two membrances is cut to a length corresponding to the diameter of the tubular body 11 to be coated. The ends of the cut strip are welded along their length so that each end 24, 25 sealingly adheres to the tubular body in the rectilinear ungrooved portion 16 thereof. The edges 26, 27 of the cut strip are also welded in a sealing manner along their length to the ungrooved portions of the tubular body 11 at both of its ends. Finally to permit membrane filters 21 and 22 to properly resist the pressures produced upon fermentation in the bottles, the membranes are also welded circumferentially to each of the edge portions 17 which define the grooves 14.

In the embodiment shown in FIGS. 5 to 8, each of the membrane filters 21, 22 is prepared from an individual strip the width of which corresponds to the height of the grooved zone 18 or 19 of the tubular body to be covered. In this embodiment there is no overlapping between the membranes and hence no need for an intermediary weld 23. Thus, the hydrophilic membrane filter 21 is cut into lengths corresponding to the diameter of the grooved zone 18 and the strip of the hydrophobic membrane filter 22, whici is of a smaller width than membrane 21, is cut into lengths corresponding to the diameter of the grooved zone 19. Each of these lengths of membrane filter 21 and 22 is welded so that their ends 24, 25 and edges 26, 27 are welded respectively in the rectilinear ungrooved portion 16 and the ungrooved portions at the ends of the tubular body 11 or at the ungrooved zone 20. As was the case with the embodiment of FIGS. 1 to 4, each of the membrane filters 21 and 22 is welded circumferentially to the edge portions 17 of the grooves 14.

Figure 1:
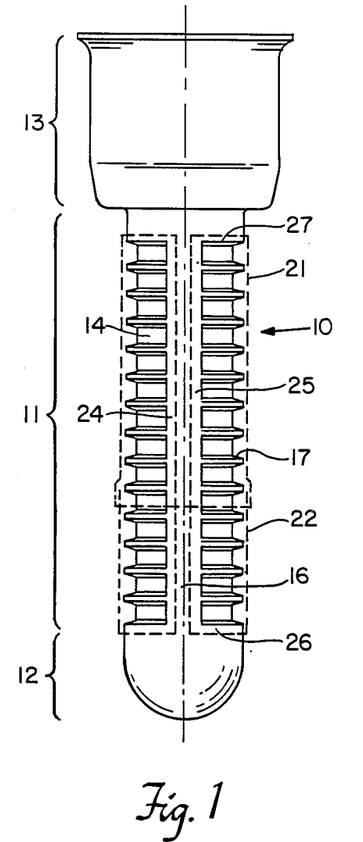
FIG. 1 represents a first embodiment of a tubular cartridge according to the invention as seen in a front view.
Figure 2:
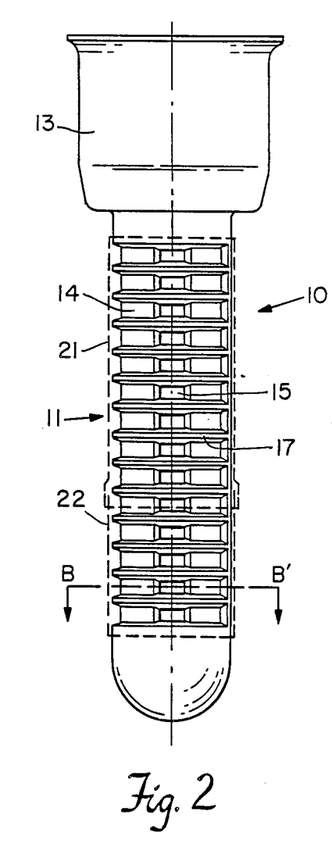
FIG. 2 represents a left-hand view of the tubular cartridge shown in FIG. 1.
Figure 3:
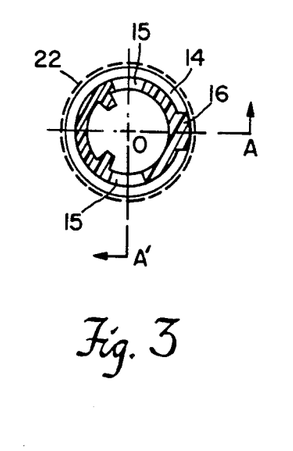
FIG. 3 represents a sectional view according to line BB' of FIG. 2.
Figure 4:
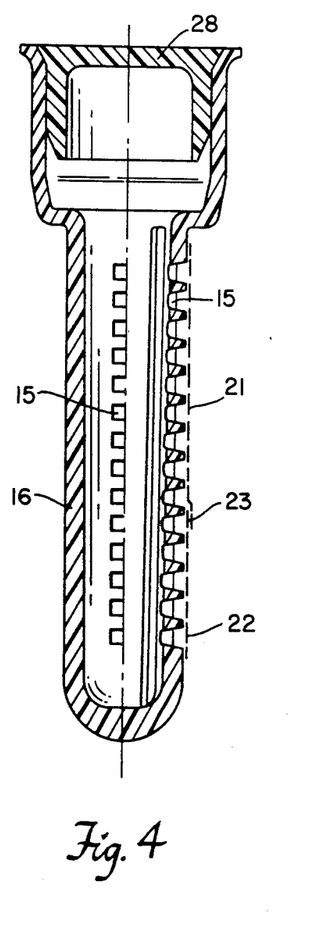
FIG. 4 represents a sectional view according to line AOA' of FIG. 3.
Figure 5:
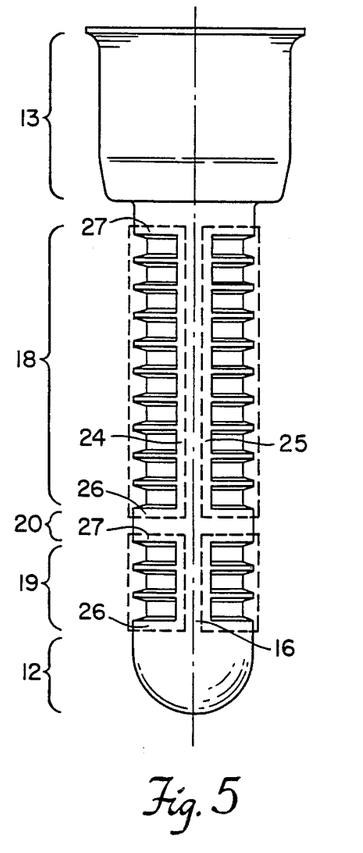
FIG. 5 represents another embodiment of a tubular cartridge according to this invention as seen in a front view.
Figure 6:
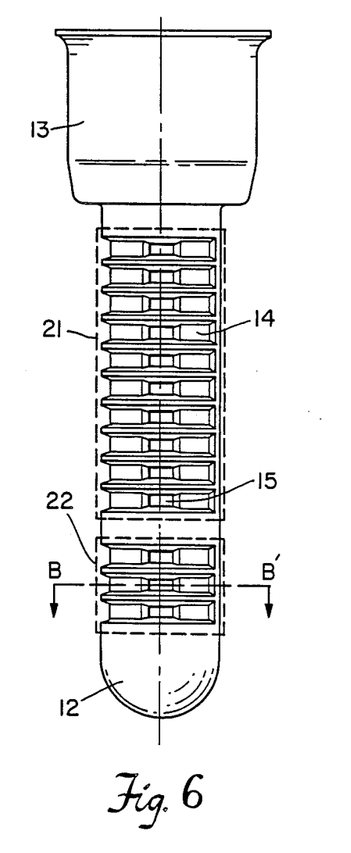
FIG. 6 represents a left-hand view of the tubular cartridge represented in FIG. 5.
Figures 7, 8:
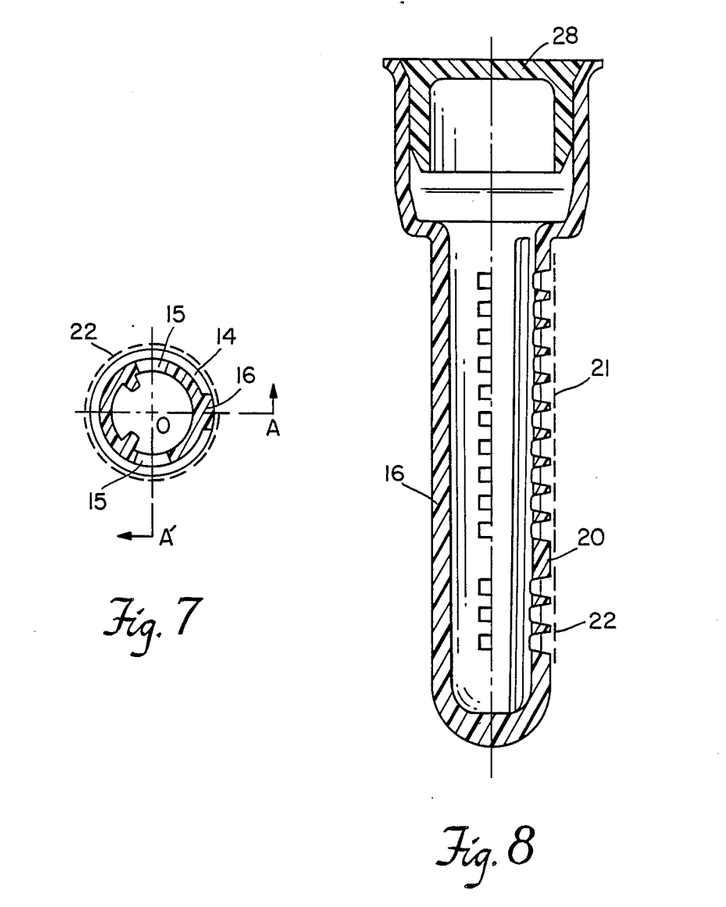
FIG. 7 represents a sectional view according to line BB' of FIG. 6.
FIG. 8 represents a sectional view according to line AOA' of FIG. 7.
Figure 9:
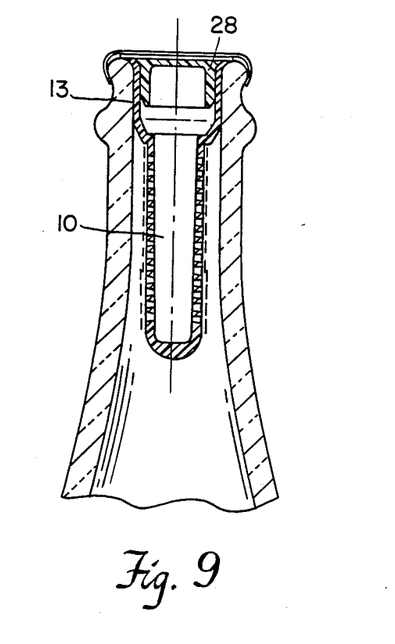
FIG. 9 represents a tubular cartridge according to the embodiment of FIGS. 1 to 4, as driven into a bottle neck.

The lower end 12 of the tubular body 11 is closed by a bottom wall and its upper end connects to a cylindrical end piece 13 having a diameter larger than that of the tubular body and which corresponds to the inner diameter of a champagne bottle as shown in FIG. 9. The cylindrical end piece 13 can also be provided with a removable cover 28 (see FIGS. 4 and 8).

The use of a cartridge according to the invention is of significant interest and offers many advantages in the refermentation of wine in a bottle. First, no foreign, non-inert material is introduced directly into the wine. The cartridge, which can be manufactured of thermoplastic material preferably a supple material such as polyethylene, contains and retains all the yeasts required for fermentation. This is accomplished by the selection of a membrane having a controlled pore size which is smaller than the size of the yeast used in the fermentation process. As a result, not only conventional yeasts used for carrying out fermentation such as Saccharamyces cerevisiae and Saccharomyces bayanus can be used, but also other yeasts which have heretofore not been deemed to be suitable due to their tendency to adhere to the bottle walls, in particular those enriched with fatty inclusions, can be used. The inner bore of the cartridge can be previously filled with the suitable yeasts in lyophilized or non-lyophilized form and may be sold ready for use to wine producers or cooperatives.

It should be noted that if required the nature of each of the microporous membrane filters can be varied, these being generally made of biologically inert polymers such as the cellulose esters, polytetrafluoroethylene or polyvinylidene fluoride. Additionally the relative proportion of the areas of both membrane filters, their respective hydrophobic and hydrophilic degrees, their respective porosities and pore diameters, these being generally comprised between 0.1 and 3 and preferably between 0.2 and 1 microns, can be altered. Microporous membrane filters having the above described characteristics are commercially available from Millipore Corporation. It is also possible to use, instead of the microporous membrane filters, semipermeable membranes having the required hydrophobic and hydrophilic characteristics.

As previously mentioned the use of a cartridge according to the invention for the carboxylic fermentation of wine in a bottle using the champagne method minimizes bottle handling and eliminates shaking steps as well as the requirement for congealation of the bottle neck at the time of disgorging. Furthermore the loss of wine upon the bottle disgorging operation using the cartridge according to the invention is kept to a minimum since such losses are limited to the amount of wine inside the cartridge upon ejection thereof.

In operation, the cartridge 10 is filled with yeast which as mentioned is retained totally by the membrane filters 21, 22, sealed closed and then inserted in the wine bottle. The sugar-admixed wine passes through the hydrophilic membrane filter 21 and comes in contact with the yeast within the cartridge to begin the fermentation process. It has been observed that the yeast has a tendency to migrate through the perforations 15 and fill the grooves 14, even coming in contact with the inner surface of the membrane filters 21, 22. Carbonic gas produced as a result of fermentation is preferentially discharged through the hydrophobic membrane filter 22 into the wine bottle producing the desired amount of carbonation. The presence of the hydrophobic membrane filter is essential to successfully carrying out the fermentation process and the corresponding production of superior champagne because it permits essentially total discharge of the carbonic gas from the interior of the cartridge. This removes any pressure barrier that would otherwise prevent the passage of sugared wine through the hydrophilic membrane filter. Once the fermentation process is complete the entire cartridge, including all the yeast, is removed from the bottle which is then resealed.

Figure 10:
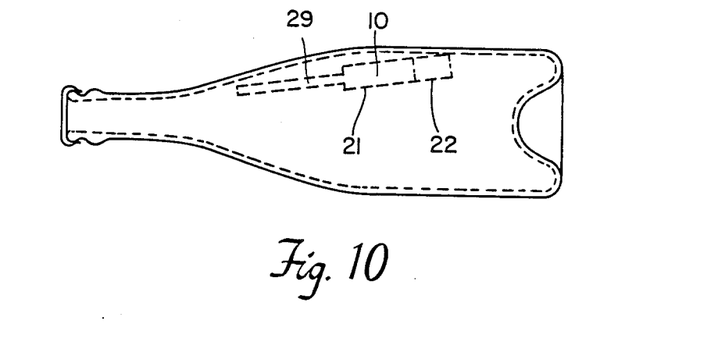
FIGS. 10 and 11 represent a third embodiment of a tubular cartridge according to the invention as provided with a floating element, FIG. 10 representing the embodiment during fermentation in a bottle and FIG. 11 upon opening the bottle.
Figure 11:
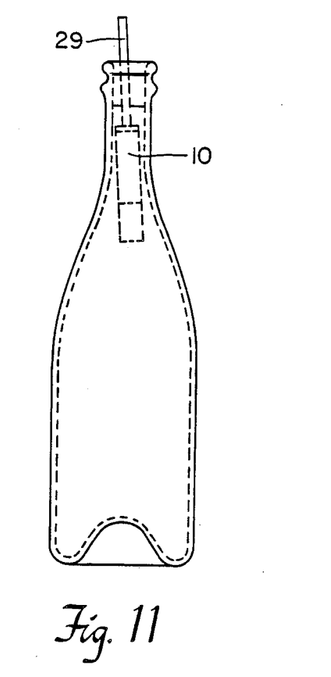

Obviously modifications can be entered into the devices of this invention without departing from its scope. For example, the cartridge according to this invention might comprise at its upper portion as shown on FIGS. 10 and 11 a floatation element 29 instead of a cylindrical end piece thereby permitting the cartridge to readily be taken out upon opening of the bottle. The floatation element 29 may consist of a simple tube of plastic material welded to the upper part of the tubular body 11 of the cartridge and closed at its other end so as to entrap a corresponding volume of air therein. The embodiment of FIGS. 10 and 11 has been shown to permit a champagne producer to obtain substantially more regular fermentation than that obtained with the embodiment represented in FIGS. 1 to 9. Although not experimentally verified, this superior result is probably due to the location of the cartridge in the middle of the bottle as shown in FIG. 10 during fermentation.

Another embodiment of the cartridge 10 according to the invention consists in having one of the membranes, for example, the hydrophilic membrane, cover the entire cylindrical perforated surface of the cartridge, while the other membrane, for example, the hydrophobic membrane, covers an open lower end of the cartridge. This embodiment which will now be described constitutes the presently preferred embodiment of the invention and is shown in FIGS. 12 to 17 wherein the same reference numerals have been used for designating the same elements as those in the previous embodiments.

Figure 12:
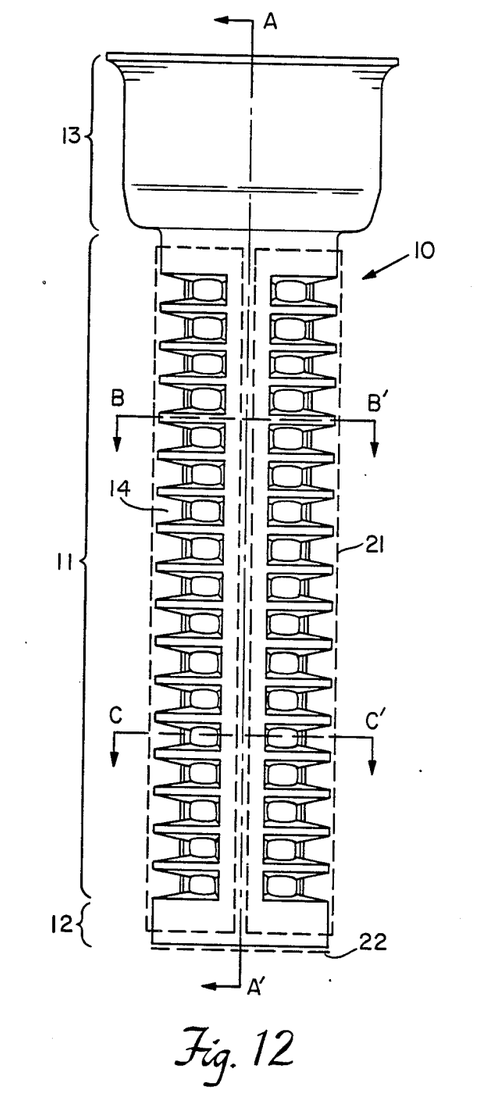
FIG. 12 represents a front view of still another embodiment of the cartridge according to this invention.
Figure 13:
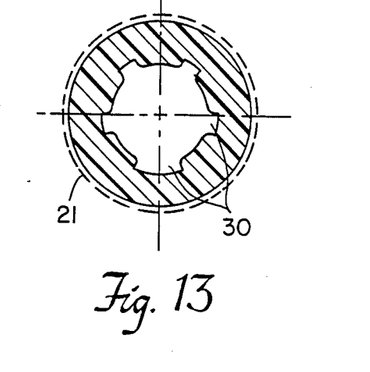
FIGS. 13 and 14 represent respective sectional views according to lines BB' and CC' of the cartridge shown in FIG. 12.
Figure 14:
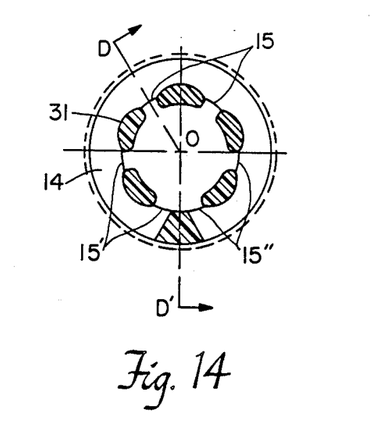
Figure 15:
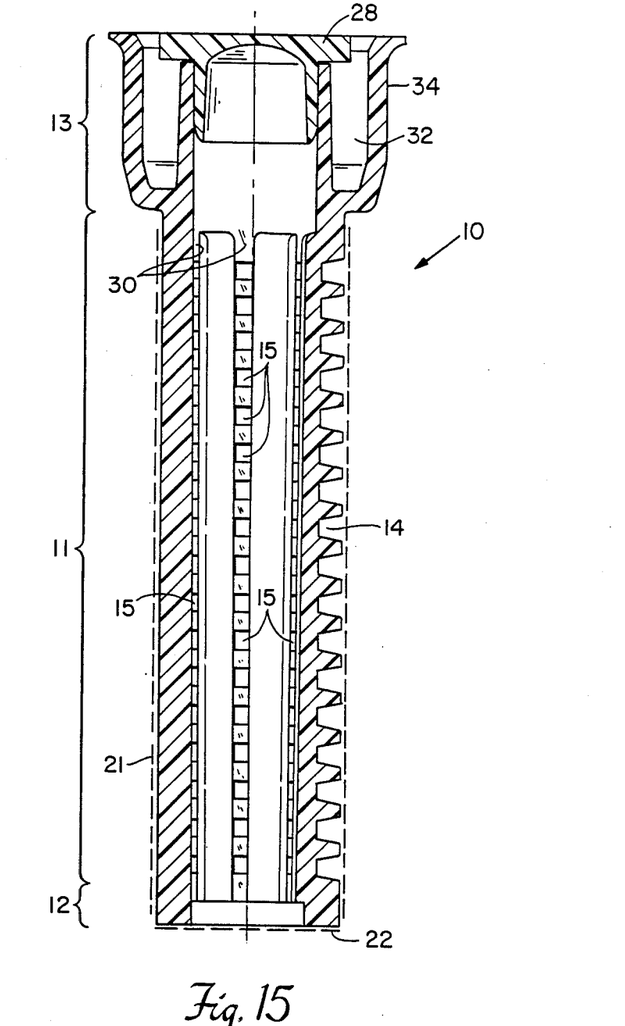
FIG. 15 represents a sectional view according to line AA' of FIG. 12.
Figures 16, 17:
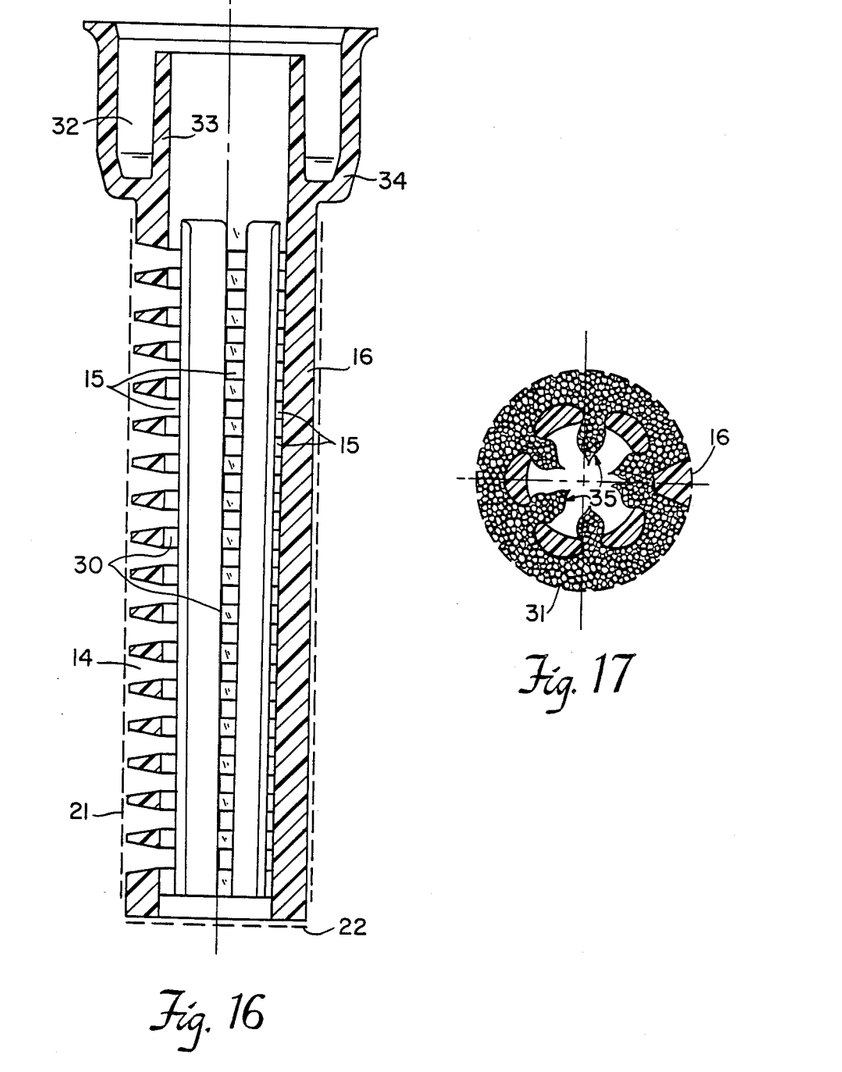
FIG. 16 is a sectional view according to line DOD' of FIG. 14.
FIG. 17 represents the same sectional view as FIG. 14 on a slightly enlarged scale and showing budding of the yeasts during fermentation at the centerline of the cartridge.

As shown in FIGS. 12, 15 and 16, the open lower end 12 of the tubular body 11 in this embodiment is covered by the hydrophobic membrane filter 22, while the hydrophilic membrane filter 21 covers the entire outer grooved surface of the tubular body 11. In this instance each circular groove 14 is provided with a greater number of perforations 15. In particular two additional pairs of perforations 15' and 15" (see FIG. 14) are provided on either side of the rectilinear portion 16 to prevent formation of dead ends of "blind alleys" thereby to provide both a more complete filling of the grooves 14 with the yeasts and to allow the discharge of carbonic gas from such grooves.

In this embodiment the tubular body 11 comprises inner longitudinal grooves 30 within the inner bore (FIG. 13) parallel to its centerline, the depth of which formed in the thickness of the walls of the tubular body 11 is such that the bottom of these grooves 30 is in fluid communication with the bottom of the circular grooves 14 to form the perforations 15. As shown by the bean shape 31 of the walls of the tubular body 11 in FIG. 14, the edges of the grooves 30 and the grooves 14 are rounded to facilitate as much as possible the flowing of the yeasts through the perforations 15. Finally, as shown in FIGS. 15 and 16 the inner bore of the tubular body 11 is extended as shown by reference numeral 33 up to the vicinity of the upper end of the cylindrical end piece 13. An annular space 32 is formed between the cylindrical extension 33 and the walls 34 of the end piece.

The extension 33 serves a dual purpose. First it limits the volume in which the yeasts will migrate without being in contact with the hydrophilic membrane. Additionally it permits, through cooperation with a cover 28 used to sealingly close the upper end of the extension 33, the cartridge to maintain the elasticity of its walls 34 (FIG. 15) without having the cover contact the walls 34 of the end piece 13. Maintaining elasticity is significant since the walls 34 must provide a sealing arrangement with the bottle neck when the cartridge is pushed therein as shown in the embodiment of FIG. 9 during the fermentation process.

The best results through refermentation of the wine in the bottle with the cartridge were obtained using the embodiment of FIGS. 12 to 17. It is theorized that such superior results can be explained as follows.

As fermentation commences, the yeasts are applied to the inner surface of the hydropholic membrane filter 21 under the effect of the production of carbonic gas which is formed within the cartridge and can only escape through the hydrophobic membrane filter 22. The feeding of the yeasts with the sugared wine through the hydrophilic membrane filter is provided by the capillary phenomenon specific to microporous or semipermeable membranes and the effective discharge of carbonic gas from the cartridge as previously explained.

As fermentation proceeds, the volume of the yeasts has a tendency to increase through budding action and the yeasts which have invaded thr grooves from the outset of the process develop in the form of radial growths 35 (FIG. 17) passing through the perforations 15, 15' and 15" and directed to the centerline of the cartridge. Thus this embodiment prevents air pockets or dead ends and favors axial discharge of carbonic gas out of the cartridge through the hydrophobic membrane filter 22. Such fermentation action produces a sparkling wine of better quality.

It is to be noted generally that the cartridges according to the invention in which, contrary to the champagne method, yeasts are not directly in contact with sugar within the bottle, have a tendency to control the wine refermentation phenomenon even when a cellar maintained at a low temperature is not available.

It will be apparent to those of skill in the art that modifications can be made to the above described embodiments without departing from the scope of the invention. For example, instead of the cartridge being of a tubular shape, other product configurations are possible. A "bag-like" container having a sealable opening for filling of yeasts and whose walls, or at least a portion thereof, are formed of the requisite hydrophilic and hydrophobic membrane filters can be used. Also, it is possible to use a single membrane having, for example, base hydrophobic properties wherein a portion of the base membrane is treated to render that portion hydrophilic to achieve the desired combination of hydrophilic/hydrophobic membranes.

Other modifications may become apparent from the foregoing description of the various embodiments of the invention. Accordingly such embodiments are exemplary in nature and are not intended as limitations thereof as the scope of the invention is to be limited solely in accordance with the following claims.

I claim:

1. A container for fermentation of a non-foamy wine within a bottle comprising:
    a body having an inner cavity adapted to be filled with yeast;
    said body including first and second means for providing fluid communication between said inner cavity and the exterior of said body, said first fluid communication means including hydrophilic membrane filter means disposed on said body and said second fluid communication means including hydrophobic membrane filter means disposed on said body; and
    each of said hydrophilic and hydrophobic membrane filter means being of a pore size to retain within said body yeast when inserted therein.

2. The container of claim 1 wherein said body is tubular and comprises a plurality of outer grooves, said grooves being circular and occupying more than three quarters of the outer circumference of said body while leaving an ungrooved portion of the circumference aligned according to a generatrix of said body and a plurality of perforations formed within said grooves, said hydrophilic membrane filter means being sealingly affixed to the exterior of said body so as to cover a first predetermined area of said perforations defining said first fluid communication means and said hydrophobic membrane filter means being sealingly affixed to the exterior of said body so as to cover a second distinct predetermined area of said perforations defining said second fluid communications means.

3. The container of claim 2 wherein said body includes an open end for admitting yeast and an opposite closed end, and each of said respective hydropholic and hydrophobic membrane filter means being welded to the exterior of the body.

4. The container of claim 1 wherein said body includes an open end for admitting yeast and an opposite closed end, and each of said respective hydrophilic and hydrophobic membrane filter means being welded to the exterior of said body.

5. The container of claims 2 4 or 3 wherein said hydrophilic and hydrophobic membrane filter means are welded longitudinally to said ungrooved portion.

6. The container of claims 2, 4 or 3 wherein said hydrophilic and hydrophobic membrane filter means are welded circumferentially along the edge portions of said circular grooves.

7. The container of claims 2, 4 or 3 wherein said hydrophilic and hydrophobic membrane filter means are welded longitudinally to said ungrooved portion and are welded circumferentially along the edge portion of said circular grooves.

8. The container of claim 4 wherein said open end includes a cylindrical end piece of flexible thermoplastic and having a diameter greater than that of said tubular body and corresponding to the diameter of a bottle neck so that said end piece is adapted to seal the opening of said bottle.

9. The container of claim 1 wherein said body is tubular and includes an opening at one end thereof sealingly covered by said hydrophobic membrane filter means, said opening and said hydrophobic membrane filter means defining said second fluid communication means, and a plurality of perforations on the outer surface of said body communicating with said inner cavity, said perforations being sealingly covered by said hydrophilic membrane filter means and defining said first fluid communication means.

10. The container of claim 9 wherein said tubular body comprises a plurality of inner longitudinal grooves therein parallel to the centerline of said body and a plurality of perforations formed within said grooves and providing communication between the interior and exterior of said container.

11. The container of claims 1, 2 or 9 wherein said container contains yeasts for producing fermentation of sugared wine, said sugared wine contacting said yeasts by passage through said hydrophilic membrane filter means and the resultant produced carbonic gas being expelled from said container by passage through said hydrophobic membrane filter means.

12. A method of fermenting a non-foamy wine within a bottle from which said wine is dispensed comprising the step of introducing a container according to claim 1 filled with yeast into said bottle.

* * * * *